United States Patent Office 3,402,148
Patented Sept. 17, 1968

3,402,148
EASILY PROCESSABLE, BLOOM-RESISTANT, URETHANE GUMS AND VULCANIZATES
Burton J. Sutker, Union, and Melvin A. Schulman, Somerset, N.J., assignors to Thiokol Chemical Corporation, Bristol, Pa., a corporation of Delaware
No Drawing. Filed July 6, 1964, Ser. No. 380,643
3 Claims. (Cl. 260—75)

ABSTRACT OF THE DISCLOSURE

Polyurethane gums may be prepared by reacting together (1) a polyether or polyester, (2) a monohydric fatty alcohol, (3) glycerol alpha-allyl ether or the monoallyl ether of trimethylolpropane, and (4) an organic polyisocyanate. These polyurethane gums may be vulcanized in the presence of a curing agent at high temperatures. The gums are easily processable and are substantially "bloom-resistant." The gums are clear and show improved freedom from occluded gas.

---

The present invention relates to the urethane arts. In particular, the present invention relates to novel, easily processable urethane gums, to novel methods for their production, and to their novel vulcanizates. More particularly, the present invention relates to novel urethane gums produced through the use of monohydric fatty alcohols, to their novel bloom-resistant vulcanizates, and to the novel processes therefor.

PROBLEMS IN THE PRIOR ART

The art has long sought millable urethane gums that are easy to process and are substantially devoid of the vexing problems induced by prior art attempts to make them easily processable. It is to this end that the present invention is directed.

Urethane crude rubbers are solid elastomeric yet somewhat thermoplastic urethane polymeric materials, commonly called "gums," which may be milled as on a rubber mill, or masticated as in a ram-type, screw masticator such as an internal mixed of the "Banbury" type with compounding adjuvants to provide compounded "stocks" suitable for subsequent vulcanization or cure to form thermoset rubbery materials called herein "vulcanizates." The processability of crude rubbers, within the meaning of this invention, and as is commonly accepted by the art, is the ease with which the gums may be milled or masticated and the ease of uniform incorporation of adjuvants therein to form stocks. Urethane gums, in general present unusual processing difficulties in that many urethanes are exceptionally "tough." This means that they require inordinately long intervals to be conditioned on a mill. Conditioning means forming a smooth, uniform band of gum on the mill roll that is necessary to the subsequent addition and uniform incorporation of compounding adjuvants thereto. Tough gums are prone to "lacing," which means formation of voids in the band of crude rubber being formed on the mill roll. They are often "nervy" which means that they are not sufficiently thermoplastic and may not band, or may form uneven bands in band thickness, and/or may form incomplete bands not uniformly covering the length of the roll. Nervy gums are especially prone to lacing. Tough urethane gums once banded on the mill roll usually receive adjuvants for uniform incorporation very slowly, and require much careful attention to prevent nerving and/or lacing or the stock being formed.

A common procedure of the art used to improve processability of rubber gums is to incorporate lubricating materials, such as fatty acids and their salts, oils, etc. as adjuvants in the gums during mastication on the mill or in the ram-screw masticator, viz., U.S. Patents 2,333,922 and 2,872,430. Although this technique may be generally successful with other types of rubber gums, it often provides difficulties with urethane gums. When such lubricants are used in effective lubrication amounts, the urethane gums will often become very soft and/or sticky. These products would tend to sag off the mill rolls, or stick thereto. Practitioners have been forced to seek out unusual non-softening and non-sticking lubricating materials, such as beeswax, viz., U.S. Patent 2,844,554. These materials, however, are often incompatible with many urethane gums, or are often only compatible to limited amounts below the effective levels for usage.

Schwartz and Elkin revealed one solution to the problem of providing easy processability in their U.S. application 186,956, filed Apr. 16, 1962, now abandoned. This involved use of fatty acids with polyols in reaction with diisocyanates to form gums. Although the gums were so prepared were easy to process, other difficulties appeared. First, carbon dioxide gas was formed by the reaction of isocyanate with the fatty acids, viz.

$$R(NCO) + HOOCR' \rightarrow R-NHCOR' + CO_2$$

bubbles became occluded in the gum and were not easily removed during processing. Further, the gas bulked the volume of the gum and detracted from economical packaging and storage prior to vulcanization. Second, the reaction rate of the fatty acids with isocyanate is much slower than that of the alcohol groups of polyol with isocyanate. This aspect provided gums which contained substantial portions, i.e., up to twenty percent of the original charge, of unreacted and occluded fatty acids when the gum was made using reasonable reaction intervals and temperatures which is to say, intervals and temperatures which would not unduly promote therein formation of excessive numbers of undesired biuret, and allophonate linkages. It was further found, that even prolonging the reaction intervals did not substantially reduce the proportion of unreacted fatty acids present, possibly because of an early set-up of the reactants to solid gum materials. The occluded fatty acids may in time migrate to the surface of the gum with an unsightly blush or "bloom." Vulcanizates prepared from such gums also oftimes may develop a bloom. Within the body of the gum, occluded fatty acids and minute bubbles of carbon dioxide gas often appeared as a haze. During processing the haze made it difficult to ascertain the presence of injurious foreign particulate matter. The presence of such particles is of considerable importance in the preparation of stocks which will later be used to provide thin vulcanized sheeting or elastomeric thread wherein such particles would seriously detract from the otherwise excellent physical properties of such sheeting or elastomeric thread.

The present invention is directed towards obviating the aforesaid problems, and represents a substantial improvement over the compositions and processes as revealed by Schwartz and Elkin.

OBJECTS OF THE INVENTION

An object of this invention is to provide more easily processable urethane gums that are substantially bloom-resistant, are of superior clarity, and show improved freedom from occluded gas.

Another object of this invention is to provide a novel method for producing such easily processable urethane gums.

Yet another object of this invention is to provide novel vulcanizates of such easily processable urethane gums which are substantially bloom-resistant and have excellent physical properties.

Still other objects of this invention will become apparent from and are implicit in the following explanations and examples.

THE INVENTION

THE GUMS

It has now been discovered that easily processable, substantially bloom-resistant, and substantially gas-free urethane gums are provided through the reaction of (i) A polyol, $R_1(OH)_n$, where $R_1$ is a substantially linear polyester or polyether group, $R_1(OH)_n$ has an average molecular weight of about 400 to about 8,000 and preferably from about 1,000 to 6,000, and wherein $n$ is a whole number greater than one, preferably 2, 3, 4, 5, or 6, and most preferably two; and (ii) a fatty alcohol, $R_2OH$, where $R_2$ is a substantially linear alkyl group of about 6 to 26 carbon atoms, which may be interrupted by olefinic linkages, and may contain lower alkyl branching groups such as methyl or ethyl; with (iii) a polyisocyanate, $R_3(NCO)_m$, wherein $R_3$ is an alkylene, arylene, alicyclic, alkarylene, or aralkylene group with a valence $m$, and $m$ is a whole number greater than one, preferably 2, 3, or 4, and most preferably two.

Another co-reactant, $R^*(OH)_b$, may also be used, wherein $b$ is a whole number that is one or more, and $R^*$ is a cure site providing group that may be olefinic, such as allylic, in unsaturation thus to provide cure sites for use with sulfur and/or peroxide, etc.

The easily processable gums so provided may be substantially designated by a composite formula such as the following where $m$ is two and $x$ mols of polyol are used:

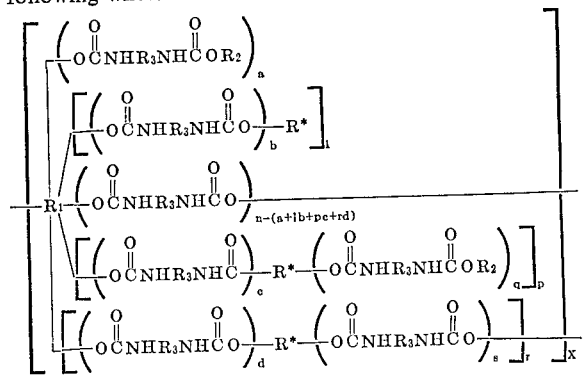

wherein for each $x$ mols of $R_1(OH)_n$ used $a+q$ mols of $R_2$—OH,
$n+pq+rs$ mols of $R_3(NCO)_m$, and
$l+p+r$ mols of $R^*(OH)_b$ are used;
$a+q$ is a positive number greater than zero and is in the range of 0.01 to 0.1

$$[(a+q)+b(l+p+r)+n];$$

$b$, $c$, $d$, and $s$ are positive numbers greater than zero, and $b=d+s$ and also $b=c+q$;
$l$, $r$, and $p$ are whole numbers including zero; and $l+r+p$ is a whole number in the range of 0 to $2n$.

Similar formulae may be written where $m$ is greater than two. It is to be understood that occasional allophonate and biuret linkages may possibly occur and join sites of urethane linkages on the same or adjoining molecules within the gum.

PREPARATION OF THE GUMS

The gums of the present invention may be prepared in general by any of the following four techniques:

(1) An isocyanate-terminated prepolymer may be formed by reaction at elevated temperatures of the polyol with an excess of polyisocyanate, exceeding in number of equivalents of isocyanate groups the number of equivalents of hydroxyl groups of the polyol, preferably by at least twice that number. The prepolymer thus formed may then further react at elevated temperatures with the present fatty alcohols, and, opionally, the cure site providing alcohols, to provide some gum molecules with fatty ends and some gum molecules, which indeed may be the fatty-ended molecules, with some cure site providing group ends such as are shown in the composite formula above. The amount of polyisocyanate used, however, although providing initially an excess of equivalents of isocyanate over equivalents of hydroxyl of the polyol, may not substantially exceed the total number of equivalents of hydroxyl provided by the polyol, the fatty alcohols, and the cure site providing alcohols that are used. Thus, the gum molecules so obtained will contain substantially little or no free reactive isocyanate, and have a ratio of equivalents of isocyanate used in their formation to equivalents of total hydroxyl that does not substantially exceed one.

(2) A one-step, or "one-shot" method may be also used to form the present gums, wherein the polyol, fatty alcohols, and, optionally, the cure site providing alcohols, may react at elevated temperatures at one time in single admixture with a polyisocyanate, in such quantities that the ratio of equivalents of isocyanate entering into reaction to that of the equivalents of hydroxyl provided by the other components does not substantially exceed one. Here too gum molecules of the type represented in the composite formulae are provided.

(3) Yet another method to provide the present gums is to react at elevated temperatures the present fatty alcohols with polyisocyanate to provide thereby a fatty-ended isocyanate adduct, and then to react this fatty-ended isocyanate adduct and additional polyisocyanate with the polyol and, optionally, the cure site providing alcohols. Again, the total of equivalents of isocyanate used is not to substantially exceed the total of equivalents of hydroxyl, thus to provide a reactant ratio of equivalents of isocyanate to equivalents of hydroxyl that is not substantially greater than one.

(4) In a fourth approach, the cure site providing alcohols, where used, may exchange roles with the fatty alcohols in method 3 above, thus also to provide the present novel gums as represented in the composite formulae.

The preferred gums of this invention are prepared using a copolyester glycol formed from ethylene and propylene adipate ester units in the weight proportions of about 50% to 95% ethylene adipate, to 50% to 5% propylene adipate units, and having a molecular weight of about 2,000 to 5,000, and most preferably about 3,500. The copolyester glycol so formed is then reacted with a diisocyanate, preferably toluene diisocyanate, and a fatty alcohol, preferably stearyl alcohol, the latter to provide the present fatty-ended gum molecules.

FATTY ALCOHOLS, $R_2OH$

The monohydric fatty alcohols which are usefully employed in preparing gums of the present invention are substantially aliphatic compounds having one hydroxyl group, approximately 6 to 26 carbon atoms in their backbone, which may be saturated or unsaturated, and which may have pendant lower alkyl side branching groups such as methyl or ethyl. Typical monohydric fatty alcohols include the saturated fatty alcohols, such as n-Hexyl alcohol,
Capryl alcohol,
Tridecyl alcohol,
Myristyl alcohol,
Stearyl alcohol,
Behenyl alcohol,
Cerotyl alcohol,
n-Octyl alcohol,
n-Decyl alcohol,
Lauryl alcohol,
Cetyl alcohol,
Arachidyl alcohol,
Lignoceryl alcohol,
and the unsaturated fatty alcohols, such as
$\Delta^9$-decynenyl alcohol,
$\Delta^9$-dodecylnenyl alcohol,
Oleyl alcohol,
Vaccenyl alcohol,
Linolenyl alcohol,
Licanyl alcohol,
Gadoleyl alcohol,
Cetoleyl alcohol,
Stillingyl alcohol,
Palmitoleyl alcohol,
Petroselinyl alcohol,
Linoleyl alcohol,
Eleostearyl alcohol,
Parinaryl alcohol,
Arachidonyl alcohol,
Erucyl alcohol, and
Selacholeyl or nervonyl alcohol.

The present fatty alcohols in the practice of this invention are used in quantities of hydroxyl equivalents that are substantially less than the number of equivalents of hydroxyl contributed by the polyols used to prepare the present gums. In general, useful quantities of the present fatty alcohols in the practice of this invention usually would not exceed 10% of the total of hydroxyl equivalents provided by the polyols, the fatty alcohols, and the cure site providing alcohols. Within the usable range of about 1 to 10 percent of the total equivalents of hydroxyl which are provided by the present fatty alcohols, generally, the preferred range for useage is about 2 to 5 percent and the most preferred percentage is about 3. In particular circumstances, however, where specific polyols and fatty acids are used, the preferred percentage contributed by the fatty alcohols may be different than 3 percent, as for example, when the polyol has a molecular weight at the high end of the range of usable molecular weights therefor, and the fatty alcohol has a molecular weight at the low end of the range of usable molecular weights therefor. In this instance, the most preferred percentage of hydroxyl equivalents may be substantially above 3 percent, and more towards 10 percent. Where the percentage of equivalents of hydroxyl contributed by the fatty alcohols is above 10 percent of the total of hydroxyl employed in making the present gums, the degree of chain stoppering by the monohydric fatty alcohols during gum formation is so extenesive as to provide compositions which are not good millable gums, and, in general, are either very soft solids or soupy liquids.

POLYOLS, $R_1(OH)_n$

A large number of different types of polyols may be employed in the practice of this invention. Many have been revealed, such as, for example, in U.S. Patents 2,606,162, 2,621,166, 2,625,531, 2,625,532, 2,625,535, 2,674,619, 2,692,873, 2,751,363, 2,801,648, 2,801,990, 2,808,391, 2,814,606, 2,843,568, 2,853,472, 2,872,430, 2,899,411, 2,900,368, 2,901,466, 2,905,652, 2,912,414, 2,921,927, 2,933,478, 2,953,839, 2,956,961, 2,965,615, 2,970,119, 2,990,378, 3,001,971, 3,042,631, and 3,043,801, which polyols so disclosed are included herein by reference. Since the nature of polyols useful in the urethane art is generally well known it need not be further extensively discussed. Polyether and polyester polyols which have been revealed in the foregoing patents which have an average molecular weight of about from 400 to about 8,000, and where the number of hydroxyl groups present per molecule is greater than one, and is preferably 2, 3, 4, 5, or 6 may be used in the practice of this invention. The most preferred polyols are those which are substantially linear polyester or polyethers in backbone, and which have an average molecular weight within the range of 1,000 to 6,000, and wherein the average number of hydroxyls per molecular unit is 2. Where the polyol has a molecular weight that is substantially less than 400 the gums obtained therefrom are defficient in rubbery properties; and where the polyols are substantially in excess of 8,000 molecular weight, gums are produced therewith which do not have the desirable high tensile strength properties commonly considered characteristic of urethane elastomers.

POLYISOCYANATES, $R_3-(NCO)_m$

Many types of polyisocyanates are usefully employed in the practice of this invention, among which the most useful are the di- and tri-isocyanates, where $m$ would equal 2 and 3 respectively. The prior art has extensively discussed the role of polyisocyanates in the urethane arts. for example in U.S. Patents:

| | |
|---|---|
| 2,333922 | 2,621,166 |
| 2,625,531 | 2,683,730 |
| 2,721,811 | 2,751,363 |
| 2,808,391 | 2,853,472 |
| 2,899,411 | 2,905,652 |
| 2,907,749 | 2,916,472 |
| 2,921,926 | 2,969,386 |
| 2,970,119 | 2,975,146 |
| 2,976,202 | 2,987,515 |
| 2,990,378 | 3,001,971 |
| 3,007,899 | 3,043,807 | are disclosed polyisocyanates of the types which may be usefully employed in the present invention, and are included herein by reference. The preferred polyisocyanates for present use are diisocyanates, among which the most preferred is toluene diisocyanate.

PREPARATION OF THE GUM STOCKS

The present gums are compounded with curing agents, and adjuvants on a mill or in an internal mixer to provide curable compositions known as "stocks," or gum stocks. As pointed to above, prime advantages obtained through the use of the present invention are attributable to the easy processability of the present gums during the preparation of stocks. No specific order of addition of adjuvants and/or curing agents to the present gums during mastication is needed, although it may be preferred to add curing agents last, to provide curable stocks for subsequent vulcanization and preparation thereby of the present novel vulcanizates.

VULCANIZATION AND VULCANIZATES

Curable stocks prepared with the present gums may be cured to form the present novel bloom-resistant vulcanizates. Cure may be effected by several methods which fall generally into two classes: (I) the cure of gums which do not have R* groups, as in the composite formula where $l$, $p$, and $r$ are all zero; and (II) the cure of gums which have cure site providing groups, R*, and where $l+p+r$ is not zero.

Cures of class I type may be effected with curing agents such as by peroxide, viz., U.S. Patent 3,036,042 and by isocyanates, such as is revealed in U.S. Patents 2,625,531, 2,625,532, 2,625,535, 2,760,953, etc.

Cures of class II type may be effected with curing agents that are reactive with the cure sites provided by the R* groups, such as sulfur with R* groups containing olefinic unsaturation at their cure sites; such cures are revealed in U.S. Patents 2,808,391, 2,912,414, 3,015,636, among others.

Vulcanization, or cure, is effected at elevated temperatures above ambient within the range of from about 225 to about 400° F. Usually, about 1 to about 10% by weight of curing agent based on the gum weight is admixed with the present novel gums and adjuvants to form curable stocks, prior to vulcanization, and upon attaining vulcanization temperatures for the time intervals of about 1 minute to about 72 hours will vulcanize the present gums to provide the present novel bloom-resistance urethane rubbers.

ADJUVANTS

Many and varied compounding ingredients, called herein adjuvants, are blended with the present gums to provide curable stocks or their vulcanizates with specific properties. Among these are cure rate accelerators, such as those revealed in U.S. Patents 2,921,926 and 2,921,927; in addition, stabilizers of one sort or another may be included, such as those disclosed in U.S. Patents 2,944,998 and 2,984,645; other compatible adjuvants include in their number fillers, such as carbon black and silicon dioxide, pigments, plasticizers or flexibilizers, and others suited to particular end use applications.

NATURE OF THE INVENTION

The bloom-resistant urethane gums and vulcanizates of this invention are unexpectedly provided through the use of monohydric fatty alcohols as a part of the active hydrogen containing reactants employed with polyisocyanate materials. The present gums obtained thereby are substantially free of haze, and thus are of superior clarity to those gums prepared by the method of Schwartz and Elkin, are substantially bloom-resistant, are not tough or sticky and thus are easily processable, and are easily reproducible and uniform in properties. Further, the present gums provide novel vulcanizates which are easily reproducible and uniform, substantially bloom-resistant, and which possess excellent physical properties.

Although a full explanation and understanding of why the present invention works is not completely appreciated at the present time, it is believed that the use of monohydric fatty alcohols as a part of the active hydrogen containing reactants (such as is defined by the Zerewitinoff method, Kohler, J. Am. Chem. Soc., 49, 3180 (1927)), in the preparation of the present gums and vulcanizates provide molecules which have fatty ends. These fatty ends, it is believed, act as internal lubricants during processing the gums on the mill or in the internal mixer. Further, it is believed, that the use of the monohydric fatty alcohols, which are used to the minor degree prescribed herein, will chain stopper enough gum molecules during their formation such that the present novel gums will have average molecular weight which is less than the average molecular weight which would otherwise be achieved in otherwise identical gums not using the present fatty alcohols as a component thereof. Lower molecular weight gums are recognized in the art to be less tough. This is to be seen through the empirical Mooney viscosity measurements on gums of this invention compared to otherwise identical gums of the prior art formed without the use of present fatty alcohols as a component thereof. High Mooney viscosity values are accepted in the art as a measure of increased toughness, and are also related to higher molecular weights of gum molecules.

EXAMPLES

The following examples depict modes of practice of the present invention but are not intended to provide limitations upon its scope as is defined in the claims.

EXAMPLES 1 TO 9

In Examples 4 to 9, below, gums of this invention were prepared by method 1 described above, wherein a polyesterglycol and a diisocyanate were reacted to form an isocyanate terminated prepolymer, and, this, in turn, was reacted with sundry fatty alcohols, and, then with a cure site providing alcohol, glycerol alpha allyl ether, to provide the present gums. Examples 1 to 3 provide gums of the prior art. The gums were then vulcanized to form rubbers.

PREPARATION OF THE POLYESTERGLYCOL, PESG

A polyesterglycol of approximately 3,000 to 3,200 average molecular weight was formed by reacting about 0.95 mol ethylene glycol and about 0.24 mol propylene glycol per mol of adipic acid approximately according to the procedure of Exmaple 1 of U.S. Patent 2,625,531. The polyesterglycol product, designated hereinafter as PESG, had a hydroxyl content of about 1.0 to 1.5% by weight and contained a ratio of approximately 4/1 ethylene adipate/propylene adipate units in its molecular backbone.

PREPARATION OF THE PREPOLYMER, PP-1

A prepolymer, hereinafter designated as PP-1, was formed by reaction of 0.25 equivalent weights PESG at about 80° C. for 4 hours with about 0.54 equivalent weights of 2,4/2,6-toluene diisocyanates (4:1 weight ratio of isomers) under nitrogen gas so as to provide a product with an isocyanate content of about 3.0 to 3.2% by weight.

PREPARATION OF THE GUMS

The prepolymer PP-1, prepared as above, was mixed at about 110° C. with sundry reactants, some of which were fatty alcohols, and all of the nature and in the quantities listed below, for a period of about 1 hour, and then with glycerol alpha allyl ether, a cure site providing dialcohol, over a period of about 0.5 hour. The liquid products were then heated for periods of about 60 hours at about 120° C., during which time extensive chain extension occurred to form solid gums with properties as listed in the table of examples.

PREPARATION OF THE VULCANIZATES

The gums, prepared as above, were processed on a rubber mill at temperatures of 180 to 225° F. to form stocks with curing agents and adjuvants according to the recipe.

| Stock component: | Parts by wt. |
|---|---|
| Gum | 100 |
| MBTS, benzothiazyl disulfide | 4 |
| MBT, 2-mercaptobenzothiazole | 1.5 |
| MBTS·zinc chloride complex | 1 |
| Cadmium stearate | 0.5 |
| Titanium dioxide | 15 |
| Silicon dioxide, Hi-Sil 233 | 10 |
| Sulfur | 1 |

Mooney viscosity measurements on the gum and scorch measurements on stocks made according to A.S.T.M. testing method D1646–59T, were taken at 212° F. using the ML-4 rotor and time, and are listed in the table of examples. The stocks were then vulcanized in a rubber press at 287° F. for 45 minutes to form test sheets. The latter were then permitted to stand at ambient temperatures for periods at least 16 and up to 72 hours prior to ascertaining their physical properties, which results are also listed in the following table of examples, according to test methods A.S.T.M. D412–51T for ultimate tensile strength and elongation, A.S.T.M. D624–54 with die C for tear strength, and A.S.T.M. D676–59T for hardness.

Examples 16 to 21

Method 4, above, was again employed now to prepare gums of this invention in Examples 16 to 21, wherein the cure site providing dialcohol, the monoallyl ether of trimethylol propane, was reacted per mol under nitrogen at

| Examples | 1 | 2 | 3 | 4 | 5 | 6 | 7 | 8 | 9 |
|---|---|---|---|---|---|---|---|---|---|
| Gum Recipe: | | | | | | | | | |
| Prepolymer, PP-1, in p.b.w | 2,500 | 1,790 | 2,200 | 2,500 | 2,500 | 2,500 | 2,200 | 2,500 | 2,338 |
| R$_2$COOH, stearic acid,[1] in p.b.w | | 9.35 | 11.5 | | | | | | |
| R$_1$OH, in p.b.w.: | | | | | | | | | |
| Decyl alcohol | | | | | | | | | |
| Tridecyl alcohol | | | | | 6.5 | | | | |
| Stearyl alcohol | | | | | | 6.5 | | | |
| Cetyl alcohol | | | | | | | 6.0 | 11.0 | 18.0 |
| R*$\dagger$-OH)$_b$, in p.b.w.: | | | | | | | | | |
| Glycerol alpha-allyl ether, b=2, GAE | 117.5 | 85.7 | 102 | 117.5 | 118.2 | 121 | 100.5 | 118 | 110.5 |
| Percent NCO in PP-1 | 3.06 | 3.28 | 3.28 | 3.19 | 3.19 | 3.19 | 3.28 | 3.19 | 3.28 |
| Percent NCO after R$_2$COOH or R$_2$OH reaction | | 3.12 | 3.02 | 3.06 | 3.08 | 3.17 | 2.98 | 3.09 | 3.09 |
| Ratio equivalents of isocyanate before GAE addition/equivalents of —OH of GAE | 1.025 | 1.025 | 1.025 | 1.025 | 1.025 | 1.025 | 1.025 | 1.025 | 1.025 |
| Weight percent R$_2$COOH or R$_2$OH | 0.0 | 0.5 | 0.5 | 0.25 | 0.25 | 0.25 | 0.5 | 0.75 | 0.5 |
| Mooney Gum Viscosity ML-4 | 80 | 50 | 23 | 40 | 39 | 50 | 22 | 26 | 46 |
| Gum Bloom Properties [2] | | B/H | B/H | NB/C | NB/C | NB/C | NB/C | NB/C | NB/C |
| Mooney Scorch on Stocks at 250° F., readings at 4 min./10 min | 7/10 | 13/16 | 25/29 | 25/29 | 24/28 | 28/32 | 26/30 | 31/36 | 12/16 |
| Processability Qualities [3] | T | E | E | E | E | E | E | E | E |
| Vulcanizate Properties: | | | | | | | | | |
| Ultimate tensile strength in p.s.i | 4,930 | 4,980 | 4,840 | 4,770 | 4,760 | 4,850 | 4,540 | 4,630 | 4,680 |
| Ultimate elongation, in percent | 630 | 590 | 670 | 660 | 650 | 620 | 680 | 680 | 579 |
| Tear strength, in p.l.i | 220 | 200 | 240 | 230 | 250 | 250 | 225 | 225 | 200 |
| Hardness in Shore "A" durometer degrees | 54 | 54 | 54 | 53 | 50 | 52 | 53 | 49 | 54 |
| Bloom properties [2] | | B | B | NB | NB | NB | NB | NB | NB |

[1] Commercial grade which contains by weight 45% stearic acid, 51% palmitic acid, and 4% oleic acid.
[2] B=bloomable; NB=non-bloomable; H=hazy; C=clear.
[3] T=tough, nervy; E=easily processable.

Examples 10 to 15

Gums of the present invention were prepared in Examples 11, 13, and 15, below, according to method 4, above, wherein the cure site providing dialcohol, glycerol alpha-allyl ether was reacted per mol under nitrogen at about 90° C. with 2.1 mols of toluene diisocyanate isomers until the isocyanate content became substantially constant. The reaction product, which was a mixture of isocyanate capped dialcohol and excess unreacted diisocyanate, called hereinafter PP-2, was then further reacted with a mixture of the polyesterglycol PESG, prepared as in Examples 1 to 9, and the fatty alcohol stearyl alcohol, under nitrogen and at about 90° C., to provide the present gums. Gums of the prior art are provided in Examples 10, 12, and 14. The gums were maintained for about 2 days at 120° C. to aid in completing the chain extension reactions prior to vulcanization and testing according to the procedures set forth in Examples 1 to 9.

about 90° C. with about 2.03 mols of toluene diisocyanate isomers until the isocyanate content became substantially constant. The product mixture of isocyanate capped dialcohol and excess unreacted diisocyanate, hereinafter called PP-3, was then further reacted with the polyester glycol PESG, prepared as in Examples 1 to 9, and the fatty alcohol stearyl alcohol, under nitrogen and at about 110° C., to provide the present gums. The gums were maintained for about 2 days at 120° C. prior to vulcanization and testing in accord with the procedures given in Examples 1 to 9. Gums prepared without the fatty alcohol, using only PP-3 and PESG are impossible to process, and, however, although gums of Examples 16, 17, 19, and 20 had high viscosities they were easy to process. Gums prepared using fatty acids are of comparable processability to the present gums herein, but are not bloom-resistant as are the present gums.

| Examples | 10 | 11 | 12 | 13 | 14 | 15 |
|---|---|---|---|---|---|---|
| Gum Recipe: | | | | | | |
| Mixture PP-2, in p.b.w | 118.9 | 118.9 | 120 | 120 | 121.2 | 121.2 |
| Stearyl alcohol, in p.b.w | | 4.05 | | 4.05 | | 4.05 |
| PESG, in p.b.w | 779.1 | 756 | 779.1 | 756 | 779 | 756 |
| Hydroxyl number | 35 | 35 | 35 | 35 | 35 | 35 |
| Acid number | 1 | 1 | 1 | 1 | 1 | 1 |
| Equivalents of isocyanate in PP-2 used | 0.5125 | 0.5125 | 0.5175 | 0.5175 | 0.5225 | 0.5225 |
| Equivalents of hydroxyl from PESG | 0.5 | 0.485 | 0.5 | 0.485 | 0.5 | 0.485 |
| Equivalents of hydroxyl from Stearyl alcohol | | 0.015 | | 0.015 | | 0.015 |
| Ratio of equivalents of isocyanate in PP-2/equivalents of —OH in PESG and Stearyl alcohol | 1.025 | 1.025 | 1.035 | 1.035 | 1.045 | 1.045 |
| Mooney Gum Viscosity, ML-4 | 58 | 29 | 63 | 30 | 64 | 33 |
| Mooney Scorch on Stocks at 250° F., readings at 4 min./10 min | 12/18 | 27/33 | 13/16 | 28/35 | 11/14 | 19/25 |
| Processability Qualities [1] | T | E | T | E | T | E |
| Vulcanizate Properties: | | | | | | |
| Ultimate tensile strength, in p.s.i | 5,280 | 5,230 | 5,300 | 4,830 | 5,170 | 4,640 |
| Ultimate elongation, in percent | 660 | 660 | 630 | 700 | 660 | 635 |
| Tear strength, in p.l.i | 210 | 205 | 215 | 180 | 200 | 245 |
| Hardness, in Shore "A" durometer degrees | 52 | 55 | 56 | 50 | 51 | 50 |

[1] T=tough; E=easily processable.

| Examples | 16 | 17 | 18 | 19 | 20 | 21 |
|---|---|---|---|---|---|---|
| Gum Recipe: | | | | | | |
| Mixture PP-3, in p.b.w | 140 | 140 | 140 | 137 | 137 | 137 |
| Stearyl alcohol, in p.b.w | 5.4 | 6.75 | 8.1 | 6.75 | 8.1 | 9.45 |
| PESG, in p.b.w | 689 | 689 | 689 | 691 | 691 | 691 |
| Hydroxyl number | 39.1 | 39.1 | 39.1 | 38.9 | 38.9 | 38.9 |
| Acid number | 0.5 | 0.5 | 0.5 | 0.48 | 0.48 | 0.48 |
| Equivalents of hydroxyl from PESG | 0.485 | 0.485 | 0.485 | 0.485 | 0.485 | 0.485 |
| Equivalents of hydroxyl from Stearyl alcohol | 0.02 | 0.025 | 0.03 | 0.025 | 0.03 | 0.035 |
| Ratio of equivalents of isocyanate in PP-3/equivalents of hydroxyl in PSEG and Stearyl alcohol | 1.035 | 1.025 | 1.015 | 1.025 | 1.015 | 0.995 |
| Mooney Gum Viscosity, ML-4 | 100 | 75 | 41 | 90 | 66 | 41 |
| Mooney Scorch on Stocks at 250° F., readings at 4 min./10 min. | 7/14 | 12/15 | 20/26 | | | |
| Vulcanizate Properties: | | | | | | |
| Ultimate tensile strength, in p.s.i. | 4,210 | 4,630 | 4,300 | 3,780 | 4,340 | 4,060 |
| Ultimate elongation, in percent | 545 | 570 | 580 | 535 | 560 | 580 |
| Tear strength, in p.l.i. | 200 | 210 | 195 | 205 | 200 | 185 |
| Hardness, in Shore "A" durometer degrees | 54 | 53 | 55 | 58 | 53 | 53 |

It is to be noted that of the four techniques given above for the present method for preparing gums of this invention each contributes different advantages either, (1) to the present general method of the invention which comprises admixing the reactants at elevated temperatures above ambient and heating the admixture at elevated temperatures above ambient until a solid, clear, urethane gum is formed or, (2) to the present gums formed therewith. The first technique involving formation of a prepolymer as an intermediate product enables the practitioner to stop at this point to store, or ship the prepolymer to customers who may then, to their needs, add the types fatty alcohol and cure site providing alcohol they desire for varied end uses. The second technique involving mixing and thus reacting all reactants at one time and in single admixture at elevated temperatures above ambient has the advantage of most quickly providing the present gums, and requiring the least amount of attention and care in their preparation of the four. The third technique, where the fatty alcohol and polyisocyanate are first admixed and reacted at elevated temperatures above ambient until the isocyanate content becomes substantially constant, insures that all of the fatty alcohol enters the gum molecules; this may prove particularly important when a polyol, particularly sensitive with respect to its ability to be compatible with amounts of a specific fatty alcohol in making gums that are neither tough nor soft and/or sticky within the ranges of reactants prescribed, is employed. The fourth technique, where initially the cure site providing alcohol and polyisocyanate are admixed and reacted at elevated temperatures above ambient until the isocyanate content becomes substantially constant, insures that all of the hydroxyls on the cure site providing alcohol have reacted with isocyanate; this is especially important when such hydroxyls are secondary. Here the rate of reaction of the secondary hydroxyls with isocyanate is usually much slower than that of the primary hydroxyls of the polyol and fatty alcohol. The fourth technique thus insures a more uniform distribution of cure providing sites contributed by R*-(OH)$_b$ throughout the gum than can be provided by the other techniques. A further advantage of the fourth technique is that it provides gums which have enhanced long term stability of Mooney viscosity over gums provided by the other techniques.

Variations or elaborations of the four techniques given may be made; for example, a combination of the third and fourth techniques may be made wherein the polyol is added only after all of the fatty alcohol and cure site providing alcohol have reacted with polyisocyanate thus to yield a gum with the advantages of both techniques, etc.

Concerning the quantities of polyisocyanate to be used, it is well recognized that active hydrogen bearing substances which are present as impurities, such as given evidence by polyol reactants having an acid number greater than zero, will usually reduce the number of equivalents of isocyanate available for useful gum formation, and so additional polyisocyanate must be used to compensate therefor.

The quantities in numbers of equivalents of isocyanate given in this application, it is thus to be understood, are of isocyanate useful in gum formation.

The use of catalysts to accelerate the rate of gum formation, especially in the lower portion of the range of effective temperatures for gum formation, may prove desirable, although their use is not necessary to forming the present gums per se. Useful catalysts for this purpose are extensively discussed by J. W. Britain in Ind. & Eng. Chem. Product Research and Development, 1, 261 (December 1962). They may, in general, be added at any point in the process for making the present gums where the reaction systems are still fluid enough to receive and have the catalysts uniformly dispersed therein by mixing. Useful quantities of catalysts, depending upon the specific catalyst considered, usually fall within the range of about 0.005 to about 0.1 part by weight per 100 parts by weight of the reactants.

It has been stated that the process for preparing the present gums is essentially a two step process, that of admixing the reactants at elevated temperatures above ambient, and that of heating said admixture at elevated temperatures above ambient until a solid clear urethane gum is formed. Such useful temperatures generally fall within the range of about 80° C. to about 250° C., although in particular circumstances temperatures either higher or lower may be used.

We claim:
1. An easily processable polyurethane gum prepared by reacting
   (a) a substantially linear polyol having a molecular weight between 400 and 8,000 and containing between 2 and 6 hydroxyl groups per polyol molecule, the polyol being selected from the group consisting of (i) polyesters, and (ii) polyethers;
   (b) a monohydric fatty alcohol having from 6 to 26 carbon atoms;
   (c) a hydroxy-containing allylic ether selected from the group consisting of (i) glycerol alpha allyl ether, and (ii) the monoallyl ether of trimethylolpropane; and
   (d) an organic polyisocyanate having the formula R-(NCO)$_m$, where R is selected from the group consisting of alkylene, arylene, alicyclic, alkarylene, and aralkylene, and $m$ is an integer greater than 1;

the fatty alcohol being present in such quantities that it provides from about 1 percent to about 10 percent of the aggregate hydroxyl equivalents of (a), (b) and (c); the hydroxy-containing allylic ether being present in such quantities that its hydroxyl equivalent does not exceed twice the hydroxyl equivalent of the polyol; the organic polyisocyanate being present in such quantities that its isocyanate equivalents are substantially equal to but do not exceed the aggregate hydroxyl equivalents of (a), (b) and (c).

2. A bloom-resistant vulcanizate prepared by vulcanizing a polyurethane gum according to claim 1 in the presence of a curing agent at a temperature between about 225° F. and 400° F.

3. The bloom-resistant vulcanizate according to claim 2, in which the fatty alcohol used in the preparation of the polyurethane gum is selected from the group of fatty alcohols consisting of decyl, tridecyl stearyl, and cetyl alcohols.

References Cited

UNITED STATES PATENTS 3,061,470  10/1962  Kuemmerer _____ 117—138.8
3,219,633  11/1965  Boussu et al. _____ 260—75

FOREIGN PATENTS 820,005  9/1959  Great Britain.
1,102,385  3/1961  Germany.

DONALD E. CZAJA, *Primary Examiner.*

F. McKELVEY, *Assistant Examiner.*